United States Patent
Hamm et al.

(10) Patent No.: US 10,516,359 B2
(45) Date of Patent: Dec. 24, 2019

(54) IDENTIFICATION OF A SECONDARY PART DURING USE IN A LINEAR-MOTOR-BASED SYSTEM

(71) Applicant: Siemens Aktiengesellschaft, Munich (DE)

(72) Inventors: Carsten Hamm, Eggolsheim (DE);
Carsten Spindler, Remptendorf (DE);
Bernd Wedel, Moehrendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/129,978

(22) Filed: Sep. 13, 2018

(65) Prior Publication Data
US 2019/0089283 A1 Mar. 21, 2019

(30) Foreign Application Priority Data
Sep. 15, 2017 (EP) ..................................... 17191295

(51) Int. Cl.
*H02P 25/06* (2016.01)
*H02K 11/225* (2016.01)

(52) U.S. Cl.
CPC ............ *H02P 25/06* (2013.01); *H02K 11/225* (2016.01); *H02P 2203/03* (2013.01)

(58) Field of Classification Search
CPC ....................................................... H02P 25/06
USPC .................................................... 318/135, 34
See application file for complete search history.

(56) References Cited

U.S. PATENT DOCUMENTS 7,412,339 B2 * 8/2008 Ramu .................. H02P 25/089
318/484
2011/0221570 A1 9/2011 Finkler et al.

FOREIGN PATENT DOCUMENTS

| DE | 102009041483 | 3/2011 |
| EP | 2351202 | 8/2011 |
| EP | 2538547 | 12/2012 |
| WO | WO2016/005790 | 1/2016 |

OTHER PUBLICATIONS

European Search Report based on EP Patent No. 17191295 dated Jan. 3, 2018.

* cited by examiner

*Primary Examiner* — David Luo
(74) *Attorney, Agent, or Firm* — Cozen O'Connor

(57) ABSTRACT

A method for identifying a secondary part during use in a linear-motor-based system, wherein a primary part includes primary-part coils in the linear-motor-based system, the secondary part has a magnetic active part and the primary-part coils can be actuated via a drive current such that an advancing force acting on the secondary part and movement of the secondary part along the primary part is achievable, where at least one secondary-part winding in a circuit is provided on the secondary part, selected primary-part coils are energized via a primary current at one or more test signal frequencies to induce a secondary current in the secondary-part winding to identify the rotor, a characteristic property of the secondary-part winding or the circuit is representative of the secondary part, and where the secondary current influences a current response of the primary-part coils and the characteristic property is measured using the current response.

21 Claims, 3 Drawing Sheets

IDENTIFICATION OF A SECONDARY PART DURING USE IN A LINEAR-MOTOR-BASED SYSTEM

BACKGROUND OF THE INVENTION

1. Field of the Invention

The invention relates to a linear-motor-based system and a method for identifying a secondary part during use in the linear-motor-based system.

2. Description of the Related Art

Linear-motor-based systems are used in the industrial field, for example, to move secondary parts, which are fitted in a movable manner on a transport system, in a controlled or regulated manner with the aid of linear motor technology. The secondary parts, sometimes also referred to as rotors, can convey, for example, components or piece goods between processing stations in a production plant or within a processing station, for example. Machine tools or other machines can also use linear motors as a drive and have secondary parts for this. Secondary parts can also be used as workpiece carriers or can be couplable to workpiece carriers, which transport workpieces in a plant. In this case, the secondary parts are moved in a highly precise manner, for example, as "carriers", along a primary part with the aid of primary-part coils provided in the primary part. The prior art has disclosed so-called multi-carrier systems (MCS), in which a plurality of secondary parts or carriers are provided on a long stator and can be moved independently of one another via appropriate actuation of the primary-part coils.

Different secondary parts or carriers are often used in such described linear-motor-based systems, such as multi-carrier systems in order to be able to process different products or to be able to perform individual movements, for example. A mixed operation of different secondary parts or carriers is therefore extremely desirable.

It is known to provide carriers or workpiece carriers in a conveying system with RFID transponders. In the system, RFID readers are then installed at specific prescribed positions, in the vicinity of which a carrier to be identified has to pause in order that its ID can be read out and it can thus be recognized by the reader.

SUMMARY OF THE INVENTION

In view of the foregoing, it is an object of the present invention to provide a simplified and more flexible method for identifying secondary parts in linear-motor-based systems. This object is achieved by the features of the independent claims. Advantageous configurations are stated in the dependent claims.

This and other objects and advantages are achieved in accordance with the invention by a method for identifying a secondary part during use in a linear-motor-based system, where a primary part having primary-part coils is provided in the linear-motor-based system, where the secondary part has a magnetic active part for forming a secondary-part magnetic field and the primary-part coils can be actuated using a drive current such that an advancing force acting on the secondary part and a movement of the secondary part along the primary part can be achieved, where at least one secondary-part winding in a circuit is provided on the secondary part, where, for purposes of identifying the rotor, selected primary-part coils are energized via a primary current at one or more test signal frequencies to induce a secondary current in the secondary-part winding, where a characteristic property of the secondary-part winding or of the circuit is representative of the secondary part, and where the secondary current influences a current response of the primary-part coils and the characteristic property is measured via the current response.

In the present application, a primary part is understood to mean an active part or a plurality of active parts of a linear-motor-based drive system. It may be a long stator that is involved, along which secondary parts are moved and which is itself installed in a stationary manner. Individual energization of the primary-part coils provided in the primary part generates a traveling magnetic field along the primary part, the primary-part magnetic field, which causes a movement of secondary parts along the primary part. A secondary part also has a magnetic active part, such as a permanent magnet, which experiences an advancing force due to the traveling magnetic field of the primary part. Here, secondary-part magnetic field formed by the magnetic active part interacts with the primary-part magnetic field, with the result that an advancing force is produced, which causes the advancing of the secondary part, such as in the horizontal direction along a horizontally fixed long stator.

In the present application, a linear-motor-based system is understood to mean a drive system in which linear motor technology is used for driving. For example, this is understood to mean linear motors, which at least in sections run in a straight line or are arranged in a straight line. This can also be understood to mean bent or curved segments or sections, in particular primary-part arrangements that are closed to form a circle, or mixed shapes composed of straight linear-motor sections and bent linear-motor sections. The linear-motor-based system is, for example, a conveyor system. The drive current is understood to mean that current that is used to energize the primary-part coils for generating the traveling magnetic field and that is responsible, for example, for the movement of the carriers along the stator. It may be a linear drive with single-coil technology having a corresponding primary part or a drive based on three-phase current having segments that are strung together.

In a so-called multi-carrier system, the primary-part coils of a long stator are assigned drive currents such that a plurality of carriers can be moved along the long stator independently of one another.

A primary part comprises, for example, a multiplicity of coils, in particular, integer multiples of three in the case of three-phase energization. For example, the primary part is constructed from a plurality of segments, which each have coils.

At least one secondary-part winding is respectively provided on a secondary part or on at least one secondary part in the case of a plurality of secondary parts. The secondary-part winding is advantageously of single-phase configuration. The secondary-part winding is advantageously fitted in spatial proximity to the permanent magnets of the secondary part, such as around a pole of a magnet. The secondary-part winding accordingly moves together with the secondary part along the primary part. The secondary-part winding is provided to induce a secondary current at a test signal frequency, which is used for energizing the primary-part coils. In the present application, a primary current is understood as an additional current component required for the identification of a secondary part. The term identification current could also be used instead of the term primary current.

The known phenomenon of the induction of a secondary current can be observed in the secondary-part winding once a primary current causes, in a spatially nearby coil, a changing magnetic field in the direction of the secondary-part winding axis. The direction of the secondary-part winding and the direction in which the energization at the test signal frequency occurs are matched to one another in order to be able to induce a current. The winding direction of the secondary part is defined and, in particular, known for this purpose.

To identify a secondary part, it is proposed to evaluate a characteristic property of the secondary-part winding or of a circuit in which the secondary-part winding is integrated. For this, the current response of the selected primary-part coils is measured. The current response or current responses are influenced by the secondary current.

In this way, the primary part functions as a reader, which reads out a characteristic property of the secondary part as a piece of identification information. The identification information or ID can be integrated on the secondary part in different ways. Reading out the identification information is possible during regular operation of the linear-motor-based system, such as during a movement of the secondary part. The identification can likewise occur during operation when the secondary part is stationary. The identification thus occurs, in particular, without requiring additional time, i.e., in a manner integrated into the actual linear motor operation and in parallel therewith and also in a particularly efficient manner with respect to the hardware outlay.

In accordance with an embodiment, the characteristic property is formed by an inductance or a saturation behavior of the secondary-part winding. In this embodiment, the secondary-part winding itself or the inductance thereof is the characteristic property. A total inductance of the system composed of a primary part and secondary part is formed by the individual inductances of the primary part and the secondary part and by a coupling factor. When the primary-part inductance and the coupling factor are known, the inductance of the secondary part can thus be deduced when the total inductance is calculated from the measurement of the amplitude of the current response. In this embodiment, for each secondary part to be identified, an inductance that is different and differing from one another, even in the case of measurement inaccuracies, therefore has to be provided.

In accordance with another embodiment, the characteristic property is formed by a resonant frequency of a series resonant circuit having the secondary-part winding. In this embodiment, the frequency of the resonant circuit is the decisive characteristic variable of a respective secondary part and different secondary parts that are used and to be identified in a linear-motor-based system are to be equipped accordingly with series resonant circuits of different resonant frequency.

In accordance with another embodiment, the characteristic property is formed by a sequence of a short in the circuit made possible with the aid of the secondary current or a load modulation made possible in the circuit. In this embodiment, the required energy, which is required for the transmission of data from the secondary part to the primary part, is provided on the secondary part with the aid of the secondary current. For example, an RFID-based method is used, RFID being short for Radio Frequency Identification. In this case, the secondary part is a passive RFID tag, which has stored a piece of identification information or ID as characteristic property. In this embodiment, the characteristic property is thus stored or contained in the circuit and the determination of the characteristic property using the current response is made possible, for example, by the induced secondary current, the provision of energy caused thereby and the effect of a transmission of digital signals on the inductance of the primary-part coils, said transmission taking place depending on the identification information through the circuit. In this way, an identifying bit pattern is transmitted.

For example, data is transmitted in the direction from the secondary part as RFID tag or RFID receiver toward the primary part as RFID reader by a short via a switch at the clock rate of the data to be transmitted, in this case at the clock rate of the identification information. The coils of the secondary part and the primary part are coupled like a transformer. Consequently, this causes an amplitude modulation of the signal in the transmission coil. The digital signal generated by switching the switch thus contains the representative information that is used to identify the secondary part. The secondary part is used as an RFID data carrier and can also be referred to as a transponder. An RFID transponder consists of a microchip. This chip is provided, for example, with a coil, which communicates with the corresponding primary part functioning as reader. In another embodiment, the identification data are exchanged via an electronic coupling method via modulation.

In accordance with another embodiment, the current response indicates the characteristic property using an amplitude, a signal shape or a time profile of the amplitude or the signal shape. For example, the current response is analyzed permanently or only at designated times. For example, energization occurs at the test signal frequency or test signal frequencies only when a secondary part has been located, for example, via an encoder system or in another way.

In accordance with yet another embodiment, a test signal frequency is output constantly, such as via a sinusoidal or square-wave test voltage. The test signal frequency is output, in particular, with the aid of a converter. The analysis of the current response is also advantageously performed with the aid of the integrated current sensors of the converter and analyzed with the aid of the likewise integrated signal processor.

In accordance with a further embodiment, different test signal frequencies are output in order to analyze the current response in a search method. This is advantageous, in particular, for methods in which the characteristic property becomes clearly apparent only in comparison with the different current responses during energization at different test signal frequencies.

In another embodiment, a winding axis of the secondary-part winding is provided at least partially, in particular completely, in a d-axis prescribed by the magnetic active part. In a particularly advantageous embodiment, the secondary-part winding is provided completely in the direction of the d-axis or the main flux direction of the secondary-part magnetic field. The secondary-part winding is then arranged, in particular, such that the winding participates in the flux generated by the permanent magnets of the secondary part. The permanent magnets of a secondary part form a main flux direction or d-direction or d-axis, which is prescribed by the spatial arrangement of the magnetic active part in the secondary part. The secondary-part winding is fitted such that it can be used in a manner that strengthens the field of the main flux direction or that weakens the field of the main flux direction. In a particularly advantageous embodiment, the secondary-part winding is fitted completely in the d-direction and the energization for identification likewise occurs in the prescribed direction (alongside a drive energization in the q-direction) such that disruption to the advancing force is minimized. An alternating magnetic field with portions in the direction prescribed by the permanent magnets influences the advancing movement as little as possible on account of the drive currents and the magnetic fields required for the advancing force.

In another embodiment, for the purpose of identification, the selected primary-part coils are energized using a primary current, which leads to an alternating magnetic field with portions, in particular completely, in the direction of a winding axis of the secondary-part winding. The energization is intended to lead to an alternating magnetic field in the direction of the winding axis of the secondary-part winding at least up to a certain portion. The better the directions of the alternating magnetic field and of the secondary-part winding correspond, the better the secondary current can be induced.

The primary-part coils are advantageously actuated via a separate current controller for the d-direction. The q-component of the primary-part magnetic field is thus advantageously influenced as little as possible. As a result thereof, the advancing movement of the secondary part is impaired as little as possible. The drive currents and the primary currents are superposed and jointly applied for a primary-part coil. In a particularly advantageous embodiment, the secondary-part winding is formed in the d-direction and the energization using the primary current likewise occurs completely in the d-direction. This maximizes, on the one hand, the impact of the secondary current on the change in the inductance of the primary-part coil and simultaneously minimizes the influencing of the primary-part magnetic field by the alternating magnetic field of the primary current.

It is also an object of the invention to provide a linear-motor-based system, having at least one primary part having primary-part coils, at least one secondary part, where the respective secondary part has a respective magnetic active part for forming a respective secondary-part magnetic field, where the primary-part coils can be actuated using a drive current such that a primary-part magnetic field forms, with the result that a movement of the at least one secondary part along the at least one primary part can be achieved, and having a respective secondary-part winding in a circuit, where a characteristic property of the secondary-part winding or of the circuit is representative of the respective secondary part, and a control unit for energizing selected primary-part coils via a primary current at one or more test signal frequencies to induce a secondary current in the secondary-part winding, and in order to measure the characteristic property via a current response of the primary-part coils, the current response being influenced by the secondary current.

In accordance with an embodiment, the circuit is a series resonant circuit. For example, the circuit also has a capacitor and a resistor in addition to the secondary-part winding.

In accordance with an embodiment, the circuit is integrated into an RFID transponder comprising stored identification information. For example, the RFID transponder is a passive RFID transponder, which obtains the energy required for the functioning and in particular the data transmission through the secondary current induced into the secondary-part winding in accordance with the transformation principle.

It is also an object of the invention to provide a non-transitory computer program product comprising a computer program, which has means for performing the above-described method, when the computer program is executed on a program-controlled device.

A non-transitory computer program product, such as a computer program means, for example, can be provided or delivered, for example, as a storage medium, such as a memory card, USB stick, CD-ROM or DVD, or else in the form of a file that can be downloaded from a server in a network. This can occur, for example, in a wireless communication network through the transmission of an appropriate file comprising the computer program product or the computer program means. The program-controlled device can be, in particular, a control device, such as a microprocessor. The computer program can also run on the converter. In this embodiment, the drive can also identify the carrier and provide the ID, for example, as a parameter, without an external controller.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be explained in more detail hereinbelow on the basis of exemplary embodiments with the aid of the figures, in which.

DETAILED DESCRIPTION OF THE EXEMPLARY EMBODIMENTS

In the figures, elements with the same function are provided with the same reference signs, unless stated otherwise.

Figure 1:
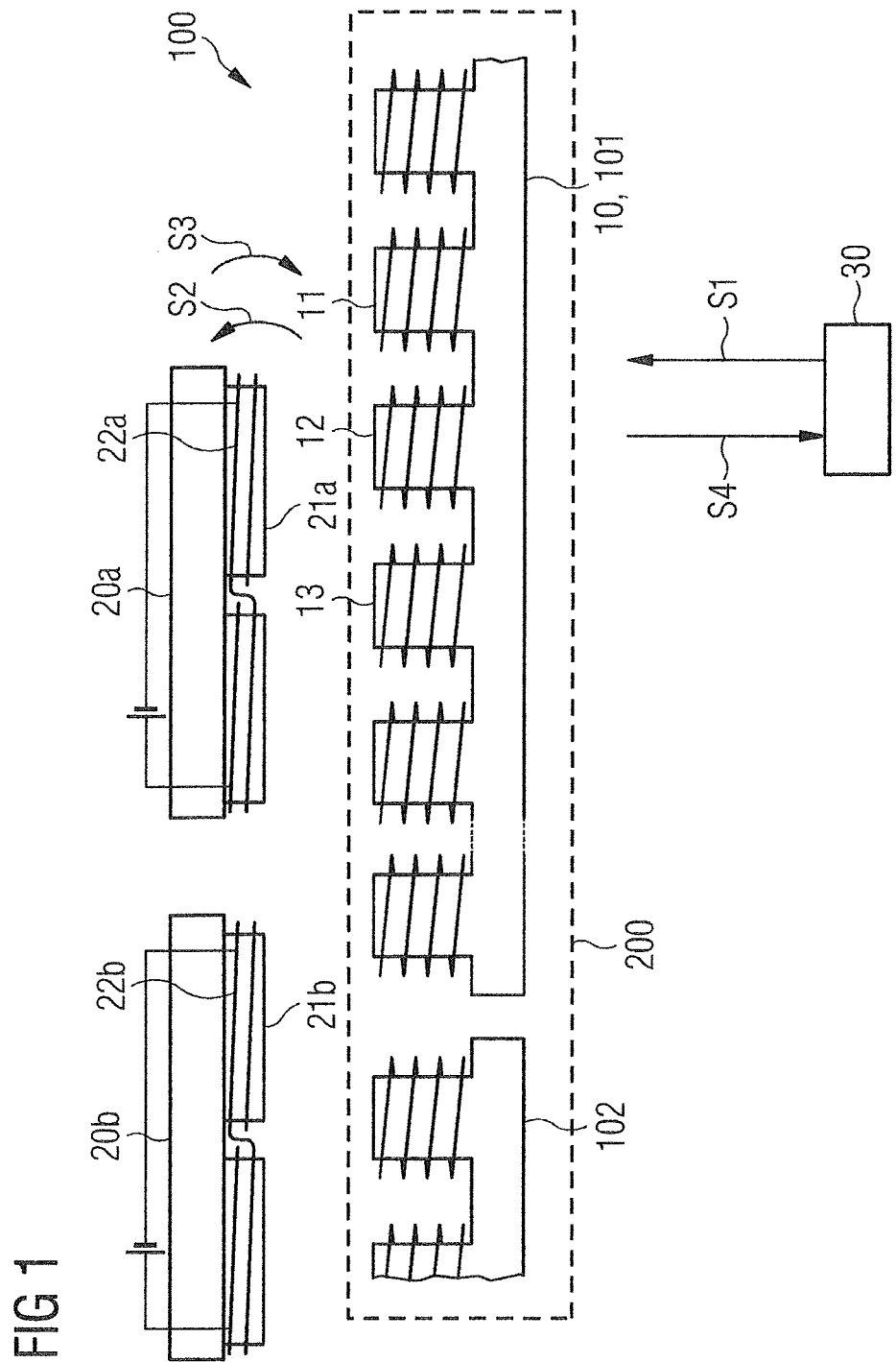
FIG. 1 shows a schematic illustration of a linear-motor-based system in accordance with a first embodiment of the invention.

FIG. 1 schematically depicts a linear-motor-based system 100, where a long stator 200, which has a plurality of primary parts 10 configured as segments 101, 102, is provided. By way of example, two secondary parts 20a, 20b are depicted, which are moved along the long stator 200 using linear motor technology. For example, 3-phase alternating current technology is used, in which, for each primary part, an arrangement composed of primary-part coils 11, 12, 13 is energized, as a result of which the forward movement of the secondary parts 20a, 20b is achieved. For example, it may be carriers within a multi-carrier system that are involved, with the carriers being able to be actuated and thus moved in a highly precise manner via the linear motor technology. The individual carriers are advantageously moved independently of one another. The linear-motor-based system 100 is used, for example, in an automation installation in which carriers from different installation sections or from different processing stations meet one another for a short partial route and are intended to be passed on to different stations or are intended to be separated, such as at the end of the linear-motor-based section. In this case, for example, only very specific carriers, which are moved as secondary parts 20a, 20b over the long stator 200, are intended to be forwarded to specific prescribed places or stations. The carriers are intended to be identifiable for this. Each carrier used in such an installation is provided with a characteristic property for this.

In the first exemplary embodiment of the invention, this characteristic property is intended to be prescribed by a characteristic resonant frequency of a series resonant circuit, which is fitted to the secondary part. To this end, each of the secondary parts 20a, 20b has a secondary-part winding 22a, 22b around the respective magnetic active part 21a, 21b. Here, the respective secondary-part winding 22a, 22b is fitted such that a secondary current is induced in the winding by specific energization of the primary-part coils 11, 12, 13. The respective secondary-part winding 22a, 22b is integrated into a series resonant circuit. To this end, a capacitor is shown in FIG. 1 by way of example. Each series resonant circuit has a resonant frequency at which the induced current is absorbed to the maximum extent. If energization S1 occurs using the control unit 30, such as a converter, such that a secondary current can be induced S2 in the secondary-part winding 22a and if the current is a current at the resonant frequency of the series resonant circuit, the current induced in the secondary-part winding 22a influences S3 the current response of the primary-part coils 11, 12, 13. The current response of the primary-part coils 11, 12, 13 is measured S4 with the aid of the control unit 30. It is thus possible to deduce the resonance of the series resonant circuit from the profile of the current response and, in particular, from the dependency of the amplitude of the current response on different frequencies that are used for the test signal frequencies. If a specific and characteristic resonant frequency is provided for each carrier in the installation, it is thus possible to deduce the identity of the carrier currently located above the energized primary-part coils 11, 12, 13. The different sequences for the test signal are thus used to implement a search method that detects the resonant frequency. Methods such as swept-sine, white noise and FFT, short for fast Fourier transformation, or pseudo-random binary signal methods using discrete Fourier transformation are feasible.

In the exemplary embodiment presented, the respective secondary-part winding 22a, 22b is matched to the resistor and capacitor of the respective distinct series resonant circuit and the resonance is set such that the resonant frequencies can be output via the converter for the primary current.

In an even less complex embodiment, a secondary-part winding, which represents a known inductance, is provided on the carrier or secondary part. The characteristic property of the secondary part 20a, 20b is thus a specific inductance, which is different from carrier to carrier in an automation installation. In this embodiment, the control unit 30 or the converter ascertains the value of the inductance and thus identifies the carrier via a test signal. Conventional methods for measuring an inductance are used, here. The amplitude of the current is analyzed as a current response and is a measure of the total inductance, which is composed of the inductance of the primary part and that of the secondary part and of a coupling factor. The primary-part inductance and the coupling factor are known, with the result that the inductance of the secondary part can be calculated. It is also conceivable to evaluate the saturation behavior of the secondary-part winding 22a, 22b and to investigate the signal shape of the current response for this. It is thus also possible to deduce a characteristic property of each individual carrier.

Figure 2:
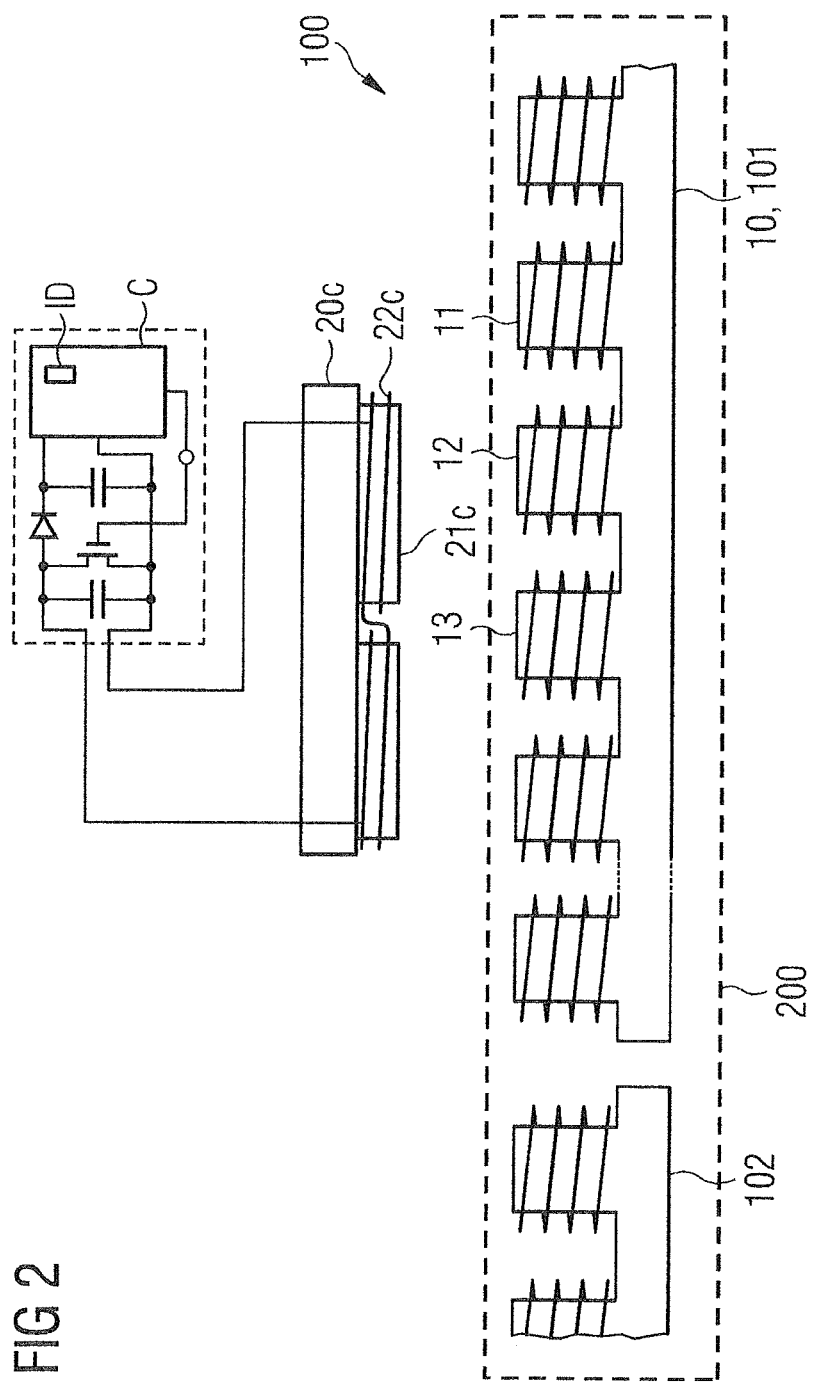
FIG. 2 shows a schematic illustration of a linear-motor-based system in accordance with a second exemplary embodiment of the invention.

FIG. 2 schematically illustrates how a secondary part 20c is identified based on RFID technology in a second exemplary embodiment of the invention. The linear-motor-based system 100 again has a long stator 200 having a plurality of primary parts 10 as segments 101, 102. The secondary part 20c is again provided with a magnetic active part 21c, such as comprising permanent magnets, so that, when drive energization is applied in the primary-part magnetic field, the secondary part 20c aims to orient itself such that a forward or backward movement of the secondary part 20c along the long stator 200 is achieved.

The secondary-part winding 22c is also fitted on the secondary part 20c such that the application of a primary current at a test signal frequency, which is output in a specific direction, induces a secondary current in the secondary-part winding 22c. To this end, the direction of the secondary-part winding 22c and the direction in which the energization at the test signal frequency occurs are matched to one another. The direction is particularly advantageously the d-direction or d-axis or main flux direction, which is prescribed by the arrangement of the permanent magnets in the secondary part 20c. The influence on the forward movement achieved by the drive energization typically occurring in the q-direction is then as undisturbed as possible.

Through the secondary-part winding 22c and the secondary current induced therein, a chip C also fitted to the secondary part obtains energy in accordance with the transformer principle, where the chip uses the energy to cause a short in an antenna. A piece of identification information ID is digitally stored on the chip C. This information ID influences a sequence, in which the short occurs, and hence the profile or the temporal change in an inductance of the secondary part. The change in inductance can again be recognized as a reaction in the current response of the primary-part coils.

In this particularly advantageous embodiment of the invention, in which a chip C is provided on the secondary part 20c, complex information for identifying an individual secondary part 20c can also be stored. The identification information ID can be supplemented, for example, with further information, such as for the provided transport path within the automation installation or for prioritization data.

In one enhanced embodiment, information is written to the secondary part using the described principle. In the described exemplary embodiment, the secondary part functions as a passive RFID tag or transponder. The secondary-part winding 20c is responsible here for the transmission of energy.

An RFID read function is advantageously integrated into a converter using the presented method and linear-motor-based system. The identification of a secondary part using an RFID tag can occur during normal operation without the secondary part having to be positioned at a predetermined location for the identification. There are no additional waiting times required for readers and the design of a conveying installation or similar can be formed in a very much more flexible manner.

Figure 3:
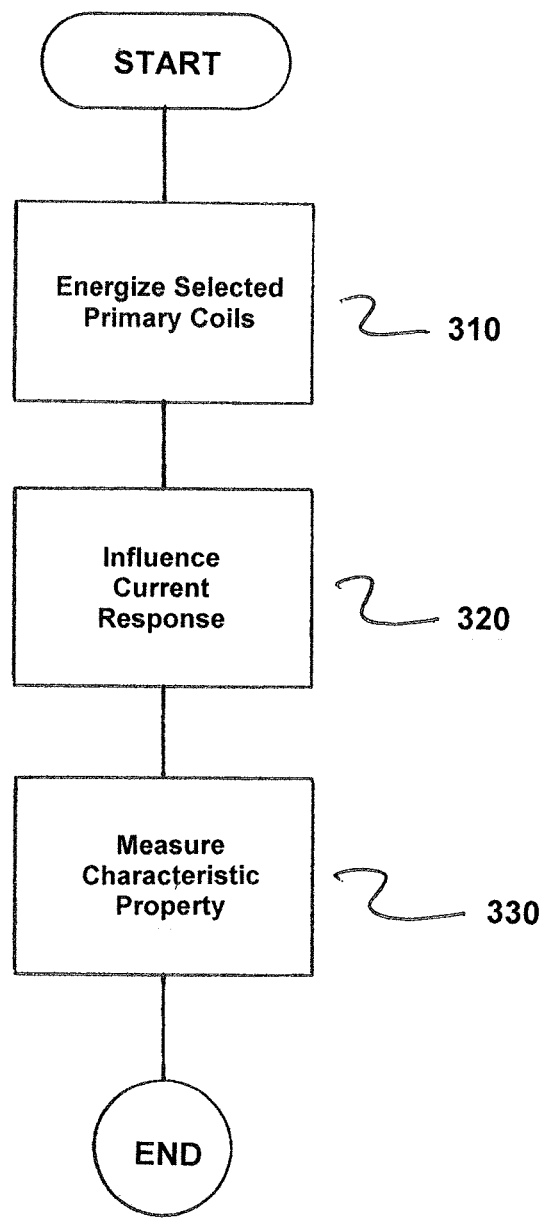
FIG. 3 is a flowchart of the method in accordance with the invention.

FIG. 3 is a flowchart of the method for identifying a secondary part during use in a linear-motor-based system, where a primary part having primary-part coils is provided in the linear-motor-based system, the secondary part has a magnetic active part for forming a secondary-part magnetic field and the primary-part coils can be actuated via a drive current such that an advancing force acting on the secondary part and a movement of the secondary part along the primary part can be achieved, and at least one secondary-part winding in a circuit is provided on the secondary part. The method comprises energizing (S1) selected primary-part coils via a primary current at at least one or test signal frequency to induce (S2) a secondary current in the secondary-part winding to identifying the rotor, as indicated in step 310. Here, a characteristic property of either the secondary-part winding or the circuit is representative of the secondary part.

Next, a current response of the primary-part coils is influenced via the secondary current (S3), as indicated in step 320. Next, the characteristic property (S4) is measured utilizing the current response, as indicated in step 330.

Although the invention has been illustrated and described in more detail by the exemplary embodiments, the invention is not restricted by the disclosed examples and other variations can be derived herefrom by a person skilled in the art without departing from the scope of protection of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for identifying a secondary part during use in a linear-motor-based system, a primary part having primary-part coils being provided in the linear-motor-based system, the secondary part having a magnetic active part for forming a secondary-part magnetic field and the primary-part coils being actuateable via a drive current such that an advancing force acting on the secondary part and a movement of the secondary part along the primary part is achievable, at least one secondary-part winding in a circuit being provided on the secondary part, the method comprising:
    energizing selected primary-part coils via a primary current at at least one or test signal frequency to induce a secondary current in the secondary-part winding to identifying the rotor, a characteristic property of one of (i) the secondary-part winding and (ii) the circuit being representative of the secondary part;
    influencing a current response of the primary-part coils via the secondary current; and
    measuring the characteristic property utilizing the current response.

2. The method as claimed in claim 1, wherein the characteristic property is formed by an inductance or a saturation behavior of the secondary-part winding.

3. The method as claimed in claim 1, wherein the characteristic property is formed by a resonant frequency of a series resonant circuit having the secondary-part winding.

4. The method as claimed in claim 1, wherein the characteristic property is formed by a sequence of a short in the circuit made possible aided by the secondary current or a load modulation made possible in the circuit.

5. The method as claimed in claim 1, wherein the current response indicates the characteristic property using one of (i) an amplitude, (ii) a signal shape and (ii) or a time profile of the amplitude or the signal shape.

6. The method as claimed in claim 1, wherein a test signal frequency is output constantly via a sinusoidal or square-wave test voltage.

7. The method as claimed in claim 1, wherein different test signal frequencies are output to analyze the current response in a search method.

8. The method as claimed in claim 1, wherein a winding axis of the secondary-part winding is provided at least partially in a d-axis prescribed by the magnetic active part.

9. The method as claimed in 8, wherein the winding axis of the secondary-part winding is provided completely in the d-axis prescribed by the magnetic active part.

10. The method as claimed in claim 1, wherein, for identification purposes, the selected primary-part coils are energized using a primary current, which leads to an alternating magnetic field with portions in the direction of a winding axis of the secondary-part winding.

11. The method as claimed in claim 10, wherein the selected primary-part coils are energized using a primary current, which leads to the alternating magnetic field with portions completely in the direction of the winding axis of the secondary-part winding.

12. A linear-motor-based system, comprising:
    at least one primary part having primary-part coils;
    at least one secondary part, a respective secondary part having a respective magnetic active part for forming a respective secondary-part magnetic field, the primary-part coils being actuatable via a drive current such that a primary-part magnetic field forms, and such that a movement of the at least one secondary part along the at least one primary part becomes achievable;
    a respective secondary-part winding in a circuit, a characteristic property of one of (i) the secondary-part winding and (ii) the circuit being representative of the respective secondary part;
    a control unit for energizing selected primary-part coils via a primary current at at least one test signal frequency to induce a secondary current in the secondary-part winding, and to measure the characteristic property via a current response of the primary-part coils, said current response being influenced by the secondary current.

13. The linear-motor-based system as claimed in claim 12, wherein the circuit is a series resonant circuit.

14. The linear-motor-based system as claimed in claim 13, wherein the secondary-part winding is embedded within the magnetic active part.

15. The linear-motor-based system as claimed in claim 12, wherein the circuit is integrated into an RFID transponder comprising stored identification information.

16. The linear-motor-based system as claimed in claim 15, wherein the secondary-part winding is embedded within the magnetic active part.

17. The linear-motor-based system as claimed in claim 12, wherein the secondary-part winding is embedded within the magnetic active part.

18. The linear-motor-based system as claimed in claim 12, wherein the secondary-part winding is provided in a spatially offset manner with respect to the magnetic active part.

19. The linear-motor-based system as claimed in claim 18, wherein the secondary-part winding is provided in a spatially, laterally offset manner with respect to the magnetic active part.

20. A non-transitory computer program product encoded with a computer program which, when executed on a program-controlled device, causes identification of a secondary-part during use in a linear-motor-based system, the computer program comprising:

program code for energizing selected primary part coils via a primary current at at least one or test signal frequency to induce a secondary current in the secondary-part winding to identify a rotor, a characteristic property of one of (i) the secondary-part winding and (ii) a circuit being representative of the secondary part;

program code for influencing a current response of the primary-part coils via the secondary current; and program code for measuring the characteristic property using the current response.

21. The non-transitory computer program product, as claimed in claim 20, wherein the program-controlled device comprises one of (i) a controller and (ii) a converter.

* * * * *